(12) United States Patent
Aoyama et al.

(10) Patent No.: US 7,132,465 B2
(45) Date of Patent: Nov. 7, 2006

(54) NEAR-INFRARED ABSORBING COAT FILM AND NEAR-INFRARED ABSORBING RESIN COMPOSITION

(75) Inventors: Takahiro Aoyama, Kawabe-gun (JP); Toshifumi Nishida, Osaka (JP); Nobuhisa Noda, Hashima (JP); Kiyoshi Masuda, Ushiku (JP); Masunori Kitao, Ushiku (JP)

(73) Assignee: Nippon Shokubai Co., Ltd., Osaka (JP)

( * ) Notice: Subject to any disclaimer, the term of this patent is extended or adjusted under 35 U.S.C. 154(b) by 283 days.

(21) Appl. No.: 10/638,430

(22) Filed: Aug. 12, 2003

(65) Prior Publication Data

US 2005/0041281 A1   Feb. 24, 2005

(51) Int. Cl.
*C08K 5/34* (2006.01)
*C08K 5/48* (2006.01)

(52) U.S. Cl. .................................................... 524/88

(58) Field of Classification Search ............... 524/88
See application file for complete search history.

(56) References Cited

U.S. PATENT DOCUMENTS 6,069,244 A * 5/2000 Masuda et al. ............. 540/139

FOREIGN PATENT DOCUMENTS

| JP | 2000177064 | 6/2000 |
|----|------------|--------|
| JP | 20003167119 | 6/2003 |

* cited by examiner

*Primary Examiner*—Kriellion Sanders
(74) *Attorney, Agent, or Firm*—Connolly, Bove, Lodge & Hutz, LLP

(57) ABSTRACT

The present invention is directed to a near-infrared absorbing coat film comprising a near-infrared absorbing dye having a maximum absorption wavelength of 780 nm to 1200 nm, which has a residual near-infrared absorbing capacity of not less than 50% after 48 hours of light irradiation in an accelerated weathering test using a UV Auto Fade Meter.

3 Claims, No Drawings

NEAR-INFRARED ABSORBING COAT FILM AND NEAR-INFRARED ABSORBING RESIN COMPOSITION

FIELD OF THE INVENTION

The present invention relates to a near-infrared absorbing coat film and a near-infrared absorbing resin composition.

PRIOR ART

Near-infrared absorbing resin compositions can form films or coating films capable of absorbing near-infrared radiations, which are heat rays, and, from the energy saving viewpoint, such films or coating films have recently attracted attention as heat ray-absorbing films capable of shielding heat rays to prevent temperature rising. For example, heat ray-absorbing films made of a near-infrared absorbing resin composition and stuck to windowpanes or sandwiched between two sheets of glass, or heat ray-absorbing films formed by applying a near-infrared absorbing resin composition, as a coating agent, to windowpanes or the like are currently in use in buildings, houses, vehicles, arcades, greenhouses and so forth.

Such a near-infrared absorbing resin composition is generally prepared by compounding a heat ray absorber and a binder resin, and inorganic fine particles or an organic dye is used as the heat ray absorber. However, inorganic fine particles are low in near-infrared absorbing performance in the wavelength range of 1,000 nm and shorter and thus have a problem in that they cannot prevent temperature rising to a satisfactory extent from the energy saving viewpoint. On the other hand, organic dyes in heat ray-absorbing films gradually lose their near-infrared absorbing performance as a result of exposure to sunlight and so forth, so that the heat ray-absorbing films are not yet satisfactory in weather resistance; there is room for studying how to maintain their near-infrared absorbing performance.

In Japanese Kokai Publication 2000-177064, there is disclosed a laminate provided with a transparent substrate, an ultraviolet-shielding layer and a heat ray-shielding layer containing a heat ray-shielding substance. This laminate has the ultraviolet-shielding layer formed on an incident light side relative to the heat ray-shielding layer so that the heat ray-shielding substance contained in the heat ray-shielding layer may be prevented from deterioration. However, there is room for studying how to modify the heat ray-shielding layer itself so as to prevent the deterioration of the heat ray-shielding substance and thus maintain the heat ray-shielding performance in an expedient and reliable manner.

SUMMARY OF THE INVENTION

The present invention, which has been made in view of the above-mentioned state of the art, has for its object to provide a near-infrared absorbing coat film and a near-infrared absorbing resin composition, each of which can exhibit excellent weather resistance while the near-infrared absorbing dye is prevented from deteriorating.

The present invention is a near-infrared absorbing coat film comprising a near-infrared absorbing dye having a maximum absorption wavelength of 780 to 1200 nm, which has a residual near-infrared absorbing capacity of not less than 50% after 48 hours of light irradiation in an accelerated weathering test using a UV Auto Fade Meter.

The present inventors made various investigations concerning near-infrared absorbing coat films or near-infrared absorbing resin compositions which form heat ray-absorbing films and, in the course thereof, paid their attention to the fact that water contained in such near-infrared absorbing coat films is one of the causes of the deterioration of near-infrared absorbing dyes, and they found that when the content of water in near-infrared absorbing coat films is reduced, the deterioration of near-infrared absorbing dyes can be prevented. Thus, they came to realize that the above object can be successfully accomplished in that manner. As a result, it has become possible to use laminates having near-infrared absorbing performance in various fields of application, and the present invention has now been completed.

DETAILED DESCRIPTION OF THE INVENTION

In the following, the present invention is described in detail.

The near-infrared absorbing coat film according to the invention is a coat film containing a near-infrared absorbing dye having a maximum absorption wavelength of 780 nm to 1200 nm. Such near-infrared absorbing coat film is formed out of a near-infrared absorbing resin composition comprising the above-mentioned near-infrared absorbing dye and a binder resin.

The near-infrared absorbing dye is a dye having a maximum absorption wavelength of 780 to 1200 nm, and the dye may comprise one single species or a combination of two or more species. When two or more dyes differing in near-infrared absorption characteristics are used, the near-infrared absorbing effect may be improved in some instances. The term "near-infrared absorbing performance" is used in the same sense as "heat ray-absorbing performance". The above binder resin comprises a polymer as an essential component and, if necessary, it contains an organic solvent and/or an unsaturated monomer. The binder resin may be used in one single species or a combination of two or more species.

Preferably used as the near-infrared absorbing dye in the practice of the invention is a dye capable of being dissolved in organic solvents, namely an organic solvent-soluble, near-infrared absorbing dye. When the dye is soluble in organic solvents, it can be easily dissolved in a binder resin solution, hence coating agent preparation is facilitated. When, conversely, the dye is poor in solubility, it is difficult to mix up the dye and the binder resin solution, hence coating agent preparation also becomes difficult. As regards the solubility in an organic solvent, it is suitable to use a near-infrared absorbing dye having a solubility of not less than 0.01% by mass in 100% by mass of the organic solvent. The organic solvent referred to above with respect to the solubility in organic solvent is not particularly restricted but may be one of or a combination of two or more of aromatic solvents such as toluene and xylene; alcohol solvents such as iso-propyl alcohol, n-butyl alcohol, propylene glycol methyl ether and dipropylene glycol methyl ether; ester solvents such as butyl acetate, ethyl acetate and cellosolve acetate; ketone solvents such as acetone, methyl ethyl ketone and methyl isobutyl ketone; dimethylformamide and the like.

The above-mentioned near-infrared absorbing dye includes, for example, phthalocyanine-based dyes, naphthalocyanine-based dyes, anthraquinone-based dyes, and naphthoquinone-based dyes. Among them, phthalocyanine-based dyes are preferably used since they are excellent in near-infrared absorbing performance and solubility in organic solvents.

The phthalocyanine-based so referred to herein means phthalocyanine, phthalocyanine complexes, and those derivatives of phthalocyanine or phthalocyanine complexes which have, on a phthalocyanine skeleton benzene ring, one or more substituents selected from among OR, SR, NHR and NRR'. R and R' are the same or different and each represents a phenyl group, an alkyl group having 1 to 20 carbon atoms or an aralkyl group having 7 to 20 carbon atoms, which may optionally have a substituent. Preferred are those phthalocyanines in which one of substituents is substituted by NHR.

Preferred as the near-infrared absorbing dye to be used in the practice of the invention are compounds represented by the following general formula (2):

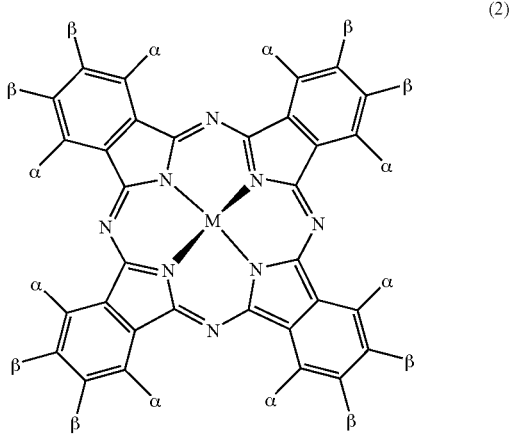

(2)

in the formula, plurality of α are the same or different and each represents $SR^1$, $OR^2$, $NHR^3$ or a halogen atom but it is essential for at least one of them to be $NHR^3$; $R^1$, $R^2$ and $R^3$ are the same or different and each represents a phenyl group, an alkyl group having 1 to 20 carbon atoms or an aralkyl group having 7 to 20 carbon atoms, which may optionally have one or more substituents; plurality of β are the same or different and each represents $SR^1$, $OR^2$ or a halogen atom but it is essential for at least one of them to be $SR^1$ or $OR^2$; it is essential at least one of pluralities of α and β to be a halogen atom or OR2; and M represents a non-metal, a metal, a metal oxide or a metal halide. They allow the effects of the invention to be produced to a fuller extent.

Referring to the above general formula (2), the alkyl group having 1 to 20 carbon atoms includes straight or branched alkyl groups such as methyl, ethyl, propyl, isopropyl, n-butyl, isobutyl, sec-butyl, tert-butyl, n-pentyl, isopentyl, neopentyl, 1,2-dimethylpropyl, n-hexyl, 1,3-dimethylbutyl, 1-isopropylpropyl, 1,2-dimethylbutyl, n-heptyl, 1,4-dimethylpentyl, 2-methyl-1-isopropylpropyl, 1-ethyl-3-methylbutyl, n-octyl and 2-ethylhexyl; cyclic alkyl groups such as cyclohexyl. The aralkyl group having 7 to 20 carbon atoms includes benzyl and phenethyl. The halogen atom includes a fluorine atom, a chlorine atom, a bromine atom and an iodine atom, among which a fluorine atom is preferred.

Referring to $R^1$, $R^2$ and $R^3$, the phenyl group, alkyl group having 1 to 20 carbon atoms or aralkyl group having 7 to 20 carbon atoms may have one or more substituents. As such substituents, there may be mentioned, for example, halogen atoms, acyl groups, alkyl groups, alkoxy groups, haloalkoxy groups, a nitro group, an amino group, alkylamino groups, alkylcarbonylamino groups, arylamino groups, arylcarbonylamino groups, a carbonyl group, and alkoxycarbonyl groups.

Referring to M in the above general formula (2), non-metal means that there are atoms other than metal, for example two hydrogen atoms. More specifically, it means a structure such that a hydrogen atom is bound to each of the two opposing nitrogen atoms, each of which may have a substituent, occurring in the central portion of the phthalocyanine structure. As the metal, there may be mentioned, for example, iron, magnesium, nickel, cobalt, copper, palladium, zinc, vanadium, titanium, indium, and tin. As the metal oxide, there may be mentioned, for example, titanyl and vanadyl. As the metal halide, there may be mentioned, for example, aluminum chloride, indium chloride, germanium chloride, tin chloride, and silicon chloride. Preferred as M are metals, metal oxides, or metal halides. As specific examples, there may be mentioned nickel, cobalt, copper, zinc, iron, vanadyl, and dichlorotin. More preferred are zinc, cobalt, vanadyl, and dichlorotin.

In preferred embodiments of the compound represented by the general formula (2), four to eight out of the eight βs are the same or different and each represents $SR^1$ or $OR^2$. More preferably, all the eight βs are the same or different and each represents $SR^1$ or $OR^2$. As such near-infrared absorbing dyes, there may be mentioned, for example, those phthalocyanine compounds symbolically referred to as $ZnPc(PhS)_8$ $(PhNH)_3F_5$, $ZnPc(PhS)_8(PhNH)_4F_4$, $ZnPc(PhS)_8(PhNH)_5$ $F_3$, $ZnPc(PhS)_8(PhCH_2NH)_4F_4$, $ZnPc(PhS)_8(PhCH_2NH)_5$ $F_3$, $ZnPc(PhS)_8(PhCH_2NH)_6F_2$, $CuPc(PhS)_8(PhNH)_7F$, $CuPc(PhS)_8(PhNH)_6F_2$, $CuPc(PhS)_8(PhNH)_5F_3$, $VOPc$ $(PhO)_8(PhCH_2NH)_5F_3$, $VOPc(PhO)_8(PhCH_2NH)_6F_2$, $VOPc$ $(PhO)_8(PhCH_2NH)_8$, $VOPc(PhS)_8(PhCH_2NH)_8$, $VOPc(2,5-Cl_2PhO)_8\{2,6-(CH_3)_2PhO\}_4\{Ph(CH_3)CHNH\}_3F$, $VOPc(2,5-Cl_2PhO)_8\{2,6-(CH_3)_2PhO\}_4(PhCH_2NH)_4$, $CuPc(2,5-Cl_2PhO)_8\{2,6-(CH_3)_2PhO\}_4(PhCH_2NH)_4$, $CuPc(PhS)_8\{2,6-(CH_3)_2PhO\}_4(PhCH_2NH)_4$, $VOPc(4-CNPhO)_8\{2,6-Br_2-4-(CH_3)PhO\}_4\{Ph(CH_3)CHNH\}_4$, and $ZnPc(2,6-Cl_2PhO)_8\{2,6-Br_2-4-(CH_3)PhO\}_4\{Ph(CH_3)CHNH\}_3F$. Among those compounds, there may particularly be mentioned the compounds in which four out of the eight αs are the same or different and each represents $OR^2$ or a halogen atom and which are symbolically referred to as $ZnPc(PhS)_8(PhNH)_3$ $F_5$, $ZnPc(PhS)_8(PhNH)_4F_4$, $ZnPc(PhS)_8(PhCH_2NH)_4F_4$, $VOPc(2,5-Cl_2PhO)_8\{2,6-(CH_3)_2PhO\}_4\{Ph(CH_3)CHNH\}_3F$, $VOPc(2,5-Cl_2PhO)_8\{2,6-(CH_3)_2PhO\}_4(PhCH_2NH)_4$, $CuPc(2,5-Cl_2PhO)_8\{2,6-(CH_3)_2PhO\}_4(PhCH_2NH)_4$, $CuPc(PhS)_8\{2,6-(CH_3)_2PhO\}_4(PhCH_2NH)_4$, $VOPc(4-CNPhO)_8\{2,6-Br_2-4-(CH_3)PhO\}_4\{Ph(CH_3)CHNH\}_4$, and $ZnPc(2,6-Cl_2PhO)_8\{2,6-Br_2-4-(CH_3)PhO\}_4\{Ph(CH_3)CHNH\}_3F$.

The amount of use of the above near-infrared absorbing dye is preferably 0.0005 to 20 parts by weight per 100 parts by weight of the binder resin, for instance. When it is less than 0.0005 part by weight, the near-infrared absorbing coat film formed from the near-infrared absorbing resin composition may fail to exhibit its near-infrared absorbing performance to a satisfactory extent and when it exceeds 20 parts by weight, the physical properties of the near-infrared absorbing coat film may decrease. It is more preferably 0.0015 to 10 parts by weight, still more preferably 0.002 to 7 parts by weight. It is also preferable to select the amount according to the thickness of the near-infrared absorbing coat film and for example, when the thickness is 10 μm, it is preferably 0.5 to 20 parts by weight, more preferably 1.0 to 10 parts by weight. When the near-infrared absorbing coat film is given a thickness of 3 mm, the amount is preferably 0.002 to 0.06 part by weight, more preferably 0.005 to 0.03 part by weight. When the thickness is 10 mm, the amount is preferably 0.0005 to 0.02 part by weight, more preferably 0.0010 to 0.01 part by weight. Furthermore, the weight of the dye contained per unit area of the near-infrared absorbing coat film is preferably 0.01 to 2.4 g/m², for instance. When it is less than 0.01 g/m², the effects of the near-infrared absorbing dye may not be produced to a satisfactory extent and when it exceeds 2.4 g/m², the production cost of the near-infrared absorbing coat film may go up. More preferably, the weight is 0.05 to 1.0 g/m².

In the practice of the present invention, water absorption of the coat film is preferably not more than 2% by mass. It is preferable that the water absorption of the coat film be as near to 0% by mass as possible. When the water absorption of the coat film exceeds 2% by mass, it becomes difficult to reduce the water content in the near-infrared absorbing coat film to an extent at which the near-infrared absorbing dye can be satisfactorily prevented from deterioration, with the result that the effects of the present invention may not be produced any longer. More preferably, the water absorption is not more than 1% by mass, still more preferably not more than 0.8% by mass. The "water absorption" of the coat film denotes the increase in weight (% by mass) resulting from absorption of water, with the lapse of time, by the coat film (coating film) formed out of the near-infrared absorbing resin composition compounded of the binder resin and near-infrared absorbing dye, if necessary together with a curing agent and/or various additives. The water absorption of the coat film is calculated by the formula given below according to the measurement method described below.

Coat Film Water Absorption Measurement Method

A 1-mm-thick coating film, about 3 cm×3 cm in size, is dried at 80° C. and at a reduced pressure of 30 mPa or below for 12 hours, and the weight ($W_0$) is then measured and employed as the initial value. Then, the film is immersed in water at room temperature (25° C.) for 20 days, then taken out of the water and weighed ($W_1$). The water absorption of the coating film is calculated as follows.

Coat film water absorption (% by mass)=$\{(W_1-W_0)/W_0\} \times 100$

In the practice of the invention, it is possible to determine the water absorption of the coat film under constant conditions, for example, using a film sample prepared by coating on the glass substrate with the near-infrared absorbing resin composition as prepared to a dry film thickness of 1 mm, then drying the resulting film under the conditions specified below, and peeling off the same from the substrate. In the practice of the present invention, there are two embodiments from the curing agent viewpoint: namely the case of producing cured coat films by causing crosslinking between the resin and a curing agent, and the case of producing dry coat films without any curing agents. In the case of producing cured coat films by crosslinking with a curing agent, it becomes possible to determine the water absorption of the coat films under constant conditions when a near-infrared absorbing resin composition is prepared by incorporating such a curing agent as specified below and a coat film is prepared under the conditions specified below for submission to water absorption measurement. The conditions of coat film (coating film) preparation for water absorption measurement are specifically shown below.

(1) Without Curing Agent (Lacquer)
Drying conditions: 3 minutes at 80° C. and then 7 days at 50° C.

(2) Curing Agent: Isocyanate Compound
Curing agent species: Product of Sumitomo Bayer Urethane Co. "Sumidur N 3200" (trademark)
Curing agent amount: Isocyanate group in a curing agent/hydroxyl group in a binder resin=1/1 (mole ratio)
Curing conditions: 3 minutes at 80° C. and then 7 days at 50° C.

(3) Curing Agent: Aminoplast Resin
Curing agent species: Product of Mitsui Cytec Ltd. "Cymel 325" (trademark)
Curing catalyst: Product of Mitsui Cytec Ltd. "Catalyst 296-9" (trademark).
Curing agent amount: Binder resin/curing agent/curing catalyst=80/19/1 (solid matter weight ratio)
Curing conditions: 30 minutes at 110° C.

In the practice of the present invention, the above binder resin preferably has a glass transition temperature (Tg) of −80 to 160° C. This is conducive to an improvement in the weather resistance of the binder resin itself, and this and the control of the water content in the near-infrared absorbing coat film allow the near-infrared absorbing performance of the near-infrared absorbing coat film to continue and, at the same time, bring about an improvement in the weather resistance and physical properties of the near-infrared absorbing coat film itself. Preferably, the Tg is −50 to 130° C., more preferably 20 to 110° C., still more preferably 40 to 100° C.

As for the species of the above-mentioned binder resin, there may be mentioned, for example, (meth)acrylic resins, (meth)acrylic-urethane resins, polyvinyl chloride resins, polyvinylidene chloride resins, melamine resins, urethane resins, styrenic resins, alkyd resins, phenol resins, epoxy resins, polyester resins and, further, (meth)acrylic-silicone resins, alkylpolysiloxane resins, silicone resins, silicone-alkyd resins, silicone-urethane resins, silicone-polyester resins, silicone-acrylic resins and like modified silicone resins, polyvinylidene fluoride, fluoroolefin-vinyl ether polymers and like fluororesins. The resin may be a thermoplastic resin or a curable resin such as a thermosetting resin, moisture-curable resin, ultraviolet-curable resin or electron beam-curable resin. Further, there may be mentioned those binder resins known in the art, for example organic binder resins such as ethylene-propylene copolymer rubbers, polybutadiene rubbers, styrene-butadiene rubbers, acrylonitrile-butadiene rubbers and like synthetic rubbers and natural rubbers; and inorganic binders such as silica sols, alkali silicates, silicon alkoxides and (hydrolysis) condensates thereof, and phosphate salts. These may be used singly or two or more of them may be used in combination. Among them, (meth)acrylic resins, (meth)acrylic-urethane resins, (meth)acrylic-silicone resins, silicone resins, silicone-alkyd resins, silicone-urethane resins, silicone-polyester resins, silicone-acrylic resins, like modified silicone resins, polyvinylidene fluoride, fluoroolefin-vinyl ether polymers and like fluororesins are preferred since they can dry at relatively low temperatures to form near-infrared absorbing coat films and the binder resins themselves are excellent in weather resistance. More preferred are (meth)acrylic resins. Acrylic resins and methacrylic resins collectively are sometimes referred as (meth)acrylic resins.

Among the (meth)acrylic resins mentioned above, those polymers which are preferably used as the binder resins in the practice of the invention are polymers resulting from polymerization of a monomer component comprising, as an essential component, a monomer represented by the following general formula (1):

$$CH_2=C(R^4)-CO-OZ \qquad (1)$$

in the formula, $R^4$ represents a hydrogen atom or a methyl group and Z represents a hydrocarbon group containing 4 to 25 carbon atoms. The monomer represented by the general formula (1) may be one single species or comprise a combination of two or more species. By using such, the durability of the near-infrared absorbing dye is improved and, in addition, the weather resistance of the binder resin itself is improved as well and, accordingly, the weather resistance of the near-infrared absorbing coat film can be further improved. In this case, the near-infrared absorbing coat film is formed out of a near-infrared absorbing resin composition including a polymer resulting from polymerization of a monomer component comprising a monomer represented by the above general formula (1).

Referring to the above general formula (1), the hydrocarbon group containing 4 to 25 carbon atoms as represented by Z includes, for example, alicyclic hydrocarbon groups such as cyclohexyl, methylcyclohexyl and cyclododecyl; straight or branched alkyl groups such as butyl, isobutyl, tert-butyl, 2-ethylhexyl, heptyl, octyl, nonyl, decyl, undecyl, dodecyl, pentadecyl and octadecyl; and polycyclic hydrocarbon groups such as bornyl and isobornyl. Among these, alicyclic hydrocarbon groups, branched alkyl groups, and straight alkyl group containing not less than 6 carbon atoms are preferred. More preferred are alicyclic hydrocarbon groups containing not less than 6 carbon atoms.

As monomers represented by the above general formula (1), there may be mentioned, for example, cyclohexyl (meth)acrylate, methylcyclohexyl (meth)acrylate, cyclododecyl (meth)acrylate, tert-butylcyclohexyl (meth)acrylate, isobutyl(meth)acrylate, tert-butyl (meth)acrylate, lauryl(meth)acrylate, isobornyl (meth)acrylate, stearyl(meth)acrylate, and 2-ethylhexyl (meth)acrylate.

The monomer represented by the general formula (1) is used preferably in an amount of not less than 30% by mass relative to 100% by mass of the whole monomer component, for instance. When the amount is less than 30% by mass, the binder resin itself may not be satisfactorily improved in weather resistance. More preferably, the amount is not less than 40% by mass, still more preferably not less than 60% by mass, most preferably not less than 80% by mass. The other copolymerizable unsaturated monomer or monomers which can be used in the above-mentioned monomer component are not particularly restricted but include the monomers listed below, for instance. These may be used singly or two or more. of them may be used in combination. Carboxyl group-containing unsaturated monomers such as (meth)acrylic acid, itaconic acid and maleic anhydride; acidic phosphate ester-based unsaturated monomers such as 2-(meth)acryloyloxyethyl acid phosphate; active hydrogen-containing group-containing unsaturated monomers such as 2-hydroxyethyl (meth)acrylate, hydroxypropyl(meth)acrylate, hydroxybutyl(meth)acrylate, caprolactone-modified hydroxy-(meth)acrylates (e.g. products of Daicel Chemical Industries, trademark "Placcel FM"); (meth)acrylate ester such as methyl (meth)acrylate, ethyl (meth)acrylate, propyl (meth)acrylate, isopropyl (meth)acrylate and butyl (meth)acrylate; epoxy group-containing unsaturated monomers such as glycidyl (meth)acrylate. Nitrogen atom-containing unsaturated monomers such as (meth)acrylamide, N,N-dimethylaminoethyl (meth)acrylate, N,N-diethylaminoethyl (meth)acrylate and imido-(meth)acrylates; unsaturated monomers having two or more polymerizable double bonds, such as ethylene glycol di(meth)acrylate, triethylene glycol di(meth)acrylate, tripropylene glycol di(meth)acrylate, trimethylolpropane tri(meth)acrylate and pentaerythritol tetra (meth)acrylate; halogen atom-containing unsaturated monomers such as vinyl chloride; aromatic unsaturated monomers such as styrene and α-methylstyrene; vinyl esters such as vinyl acetate; vinyl ethers.

The present invention is also concerned with a near-infrared absorbing resin composition comprising a near-infrared absorbing dye having a maximum absorption wavelength of 780 nm to 1200 nm and a polymer resulting from polymerization of a monomer composition comprising not less than 30% by mass of a monomer represented by the above general formula (1). Such near-infrared absorbing resin composition is suitably used as a resin composition for forming the near-infrared absorbing coat film according to the invention.

In the practice of the invention, a polymerizable ultraviolet absorbing monomer or polymerizable ultraviolet stabilizer monomer may be used as an unsaturated monomer for copolymerization in the binder resin so as to improve the weather resistance of the near-infrared absorbing coat film. In particular, when an ultraviolet-shielding ability is required of the near-infrared absorbing coat film of the invention, an ultraviolet absorbing group-containing unsaturated monomer such as the benzotriazole, benzophenone or triazine type, for instance, may be used. Specifically, there may be mentioned "RUVA 93" (trademark; product of Otsuka Chemical Co., Ltd.), "BP-1A" (trademark; product of Osaka Organic Chemical Ind.) and the like. These may be used singly or, where necessary, two or more of them may be used appropriately in combination. In cases where a further improvement in weather resistance is required of the binder resin, an unsaturated monomer having an ultraviolet stabilizer group including a sterically hindered piperidine group may be used. More specifically, there may be mentioned "Adekastab LA-82" and "Adekastab LA-87" (both trademarks, products of Asahi Denka Kogyo). These may be used singly or, where necessary, two or more of them may be used appropriately in combination.

The above binder resin can be produced by any of the polymerization methods known in the art, for example in the manner of solution polymerization, dispersion polymerization, suspension polymerization or emulsion polymerization, using a polymerization initiator. The solvent to be used in solution polymerization is not particularly restricted but one or more of those organic solvents mentioned hereinabove may be used, for instance. The amount of the solvent to be used may be selected according to the polymerization conditions, the weight proportion of the polymer in the binder resin and other factors.

The above-mentioned polymerization initiator is not particularly restricted but includes, for example, 2,2'-azobis(2-methylbutyronitrile), tert-butyl peroxy-2-ethylhexanoate, 2,2'-azobisisobutyronitrile, benzoyl peroxide, di-tert-butyl peroxide, and other ordinary radical polymerization initiators. These may be used singly or two or more of them may be used in combination. The amount of use thereof may be appropriately selected according to the physical property values desired of the polymer and so forth. Preferably, it is for example 0.01 to 50% by mass, more preferably 0.05 to 20% by mass, relative to 100% by mass of the monomer component.

The polymerization conditions in the above polymerization method are not particularly restricted but may be appropriately selected. For example, the polymerization temperature is preferably within the range of room temperature to 200° C., more preferably 40 to 140° C. The reaction time may be adequately selected according to the composition of the monomer component and the species of the polymerization initiator, so that the polymerization reaction may be driven to completion.

The polymer constituting the above binder resin preferably has a number average molecular weight of 1,000 to 100,000, for instance, more preferably 2,000 to 80,000, still more preferably 4,000 to 60,000. The weight average molecular weight is a value measured by GPC (gel permeation chromatography) on the polystyrene standard basis.

The amount of use of the above binder resin is preferably 50 to 99.9995% by mass, for instance, relative to 100% by mass of the near-infrared absorbing resin composition. When the amount is less than 50% by mass, the near-infrared absorbing coat film formed out of the near-infrared absorbing resin composition may fail to acquire satisfactory physical properties and when it exceeds 99.9995% by mass, the weight proportion of the near-infrared absorbing dye becomes small, so that the near-infrared absorbing performance of the near-infrared absorbing coat film may become unsatisfactory. More preferably, the amount is 60 to 99.9985% by mass, still more preferably 70 to 99.998% by mass.

Preferably, the near-infrared absorbing coat film further contains a dehydrating agent. This can effectively suppress the water content in the near-infrared absorbing coat film together with the binder resin. While the dehydrating agent includes various inorganic compounds and organic compounds, one which will evaporate in the step of coat film formation and will not remain thereafter is preferably used in the practice of the invention since it do not cause any decrease in coat film performance. In this respect, the use of a relatively volatile organic dehydrating agent is preferable. As examples of such dehydrating agent, there may be mentioned trimethyl orthoformate, triethyl orthoformate, trimethyl orthoacetate, triethyl orthoacetate, methyltrimethoxysilane, γ-methacryloxypropyltrimethoxysilane, vinyltrimethoxysilane, methyl silicate, ethyl silicate, and like hydrolyzable ester compounds. They may be used singly or two or more of them may be used in combination. A preferred embodiment of chemical structure of such dehydrating agent may be represented, for example, by the following general formula (3):

(3)

in the formula, $R^5$, $R^6$, $R^7$ and $R^8$ are the same or different and each represents an organic group containing 1 to 8 carbon atoms, preferably an organic group containing 1 to 3 carbon atoms. The amount of use of the dehydrating agent is preferably 1 to 20 parts by weight, for instance, more preferably 2 to 10 parts by weight, still more preferably 3 to 7 parts by weight, per 100 parts by weight of the binder resin. When the amount is less than 1 part by weight, the effect of the dehydrating agent may not be produced to a full extent and, when it exceeds 20 parts by weight, the physical properties of the near-infrared absorbing coat film may decrease.

The near-infrared absorbing coat film of the invention may be used either in a crosslinked form or in an uncrosslinked form. From the dye durability improvement viewpoint, however, a crosslinked coat film is preferred. For example, a cured film crosslinked by itself or by incorporation of a crosslinking agent is preferred.

The near-infrared absorbing resin composition which forms the near-infrared absorbing coat film of the invention can be cured under various curing conditions according to the intended use and the crosslinking agent. Thus, it can be used as an ordinary temperature curing, heat-curing, or ultraviolet or electron beam-curing type composition. The amount of use of the crosslinking agent, the method of addition and dispersion and other particulars are not particularly restricted. When, for example, the binder resin is constituted of a polyol having a plurality of hydroxyl groups in each molecule, the amount of use may be an ordinary amount generally employed for polyols and the methods of addition and dispersion may be in general.

When the binder resin is constituted of a polyol, a (blocked) polyisocyanate compound or an aminoplast resin, for instance, may be used as the above-mentioned crosslinking agent. The crosslinking agent may comprise one single species or a combination of two or more species.

The (blocked) polyisocyanate compound referred to above means a polyisocyanate compound and/or a blocked polyisocyanate compound.

The polyisocyanate compound is not particularly restricted but may be any of those compounds having at least two isocyanato groups in the molecular, including, for example, polyisocyanates such as tolylene diisocyanate, xylylene diisocyanate, diphenylmethanediisocyanate, 1,6-hexamethylene diisocyanate, isophoronediisocyanate, 4,4'-methylenebis(cyclohexyl isocyanate), lysine diisocyanate, trimethylhexamethylene diisocyanate, 1,3-bis(isocyanatomethyl)cyclohexane, 1,5-naphthalenediisocyanate, and triphenylmethanetriisocyanate; adducts, biuret forms and isocyanurate forms of these polyisocyanates and like polyisocyanate derivatives (modifications).

The blocked polyisocyanate compound mentioned above is generally derived from the corresponding polyisocyanate compound by blocking the isocyanate groups thereof with a blocking agent for allowing the near-infrared absorbing resin composition to be crosslinked upon drying by heating and, in addition, improving the storage stability at ordinary temperature.

The above-mentioned blocking agent is not particularly restricted but includes, for example, such compounds as ε-caprolactam, phenol, cresol, oximes, and alcohols.

Commercially available as the above-mentioned (blocked) polyisocyanate compounds are, for example, Sumidur N 3200, Sumidur N 3300, Sumidur BL 3175, Desmodur N 3400, Desmodur N 3600, Desmodur VPLS 2102 (trademarks, products of Sumitomo Bayer Urethane), and Duranate E-402-90T (trademark, product of Asahi Chemical Industry). Non-yellowing polyisocyanate compounds free of any isocyanate group directly bound to the aromatic ring are preferred so as to prevent the near-infrared absorbing coat film formed out of the near-infrared absorbing resin composition from yellowing.

The amount of use of the above (blocked) polyisocyanate compound is not particularly restricted but preferably is such that the isocyanate groups in the (blocked) polyisocyanate compound amount to 0.6 to 1.4 moles, for instance, per mole of the hydroxyl groups in the binder resin. When it is less than 0.6 mole, an excessively large number of unreacted hydroxyl groups will remain in the near-infrared absorbing resin composition and, therefore, the weather resistance of the near-infrared absorbing coat film formed by using the resulting near-infrared absorbing resin composition may be deteriorated. When it exceeds 1.4 moles, an excessively large number of unreacted isocyanate groups will remain in the near-infrared absorbing coat film and they will react with the moisture in air in the step of coat film curing, causing foaming in and/or whitening of the coat film. More preferably, the amount is 0.8 to 1.2 moles.

The above-mentioned aminoplast resin is an addition condensate from an amino group-containing compound, such as melamine or guanamine, and formaldehyde. It is referred to also as amino resin.

The above aminoplast resin is not particularly restricted but includes, for example, dimethylolmelamine, trimethylolmelamine, tetramethylolmelamine, pentamethylolmelamine, hexamethylolmelamine, fully alkylated type methylated melamine, fully alkylated type butylated melamine, fully alkylated type isobutylated melamine, fully alkylated type mixedly etherified melamine, methylol group type methylated melamine, imino group type methylated melamine, methylol group type mixedly etherified melamine, imino group type mixedly etherified melamine, and like melamine resins; butylated benzoguanamine, methyl/ethyl mixedly alkylated benzoguanamine, methyl/butyl mixedly alkylated benzoguanamine, butylated glycoluril, and like guanamine resins.

Commercially available as the above aminoplast resin are, for example, Cymel 1128, Cymel 303, Mycoat 506, Cymel 232, Cymel 235, Cymel 771, Cymel 325, Cymel 272, Cymel 254, Cymel 1170 (all trademarks, products of Mitsui Cytec Ltd.), and so forth.

The amount of use of the above aminoplast resin is not particularly restricted but is preferably such that the binder resin-to-aminoplast resin solid matter weight ratio amount to 9/1 to 6/4, for instance. When the binder resin proportion is less than 6/4, the resulting near-infrared absorbing coat film will become excessively hard, so that the coat film performance may decrease. When the binder resin proportion is above 9/1, the crosslinking will not proceed to a sufficient extent, so that the resulting near-infrared absorbing coat film may become poor in water resistance and solvent resistance.

Where necessary, the above near-infrared absorbing resin composition may contain one or two or more of curing catalysts for promoting the crosslinking reaction between the binder resin and crosslinking agent. Such curing catalyst is not particularly restricted but such a catalyst as dibutyltin dilaurate or a tertiary amine is preferably used when the above-mentioned (blocked) polyisocyanate compound is used. When the above aminoplast resin is used, an acidic or basic curing catalyst is preferably used.

The near-infrared absorbing resin composition, which is to form the near-infrared absorbing coat film according to the invention, may contain one or more species of solvents, additives and so forth as ingredients other than those mentioned above. As such solvents, there may be mentioned the same organic solvents as mentioned hereinabove and, as the additives, there may be mentioned those additives known in the art and used generally in resin compositions for forming films or coating films, for example leveling agents; inorganic fine particles such as colloidal silica and alumina sols; antifoaming agents; antisagging agents, silane coupling agents; pigments such as titanium white, composite oxide pigments, carbon black, organic pigments, and pigment intermediates; pigment dispersants; antioxidants; viscosity modifiers; ultraviolet stabilizers; metal deactivators; peroxide decomposers; fillers; reinforcing agents; plasticizers; lubricants; anticorrosives; rust preventives; fluorescent whitening agents; organic and inorganic ultraviolet absorbers; inorganic heat ray absorbers; organic and inorganic flame retardants; antistatic agents; etc.

The near-infrared absorbing coat film of the invention is used in such a form as a laminate provided with the near-infrared absorbing coat film as a near-infrared absorbing layer formed from the near-infrared absorbing resin composition on a transparent substrate, or as a laminate having such layer sandwiched between two transparent substrate layers.

The above transparent substrate is not particularly restricted but includes, for example, organic substrates such as polycarbonate resins, acrylic resins, polyethylene resins, polyester resins, polypropylene resins, polystyrene resins, polyvinyl chloride resins; inorganic substrates such as glass. The above transparent substrate may be colored and/or printed with various designs.

As the method of forming the above-mentioned near-infrared absorbing layer, there may be mentioned, for example, (1) a method comprising applying the near-infrared absorbing resin composition to a transparent substrate and then curing the thus-applied near-infrared absorbing resin composition to form a near-infrared absorbing layer, and (2) a method comprising molding the near-infrared absorbing resin composition into a film and attaching the film to a transparent substrate to form a laminate. The method (1) is simple and convenient, hence is preferred.

As the method of applying the near-infrared absorbing resin composition to a transparent substrate in the method of forming a near-infrared absorbing layer mentioned above, there may be mentioned, for example, such techniques as dipping, spraying, brushing, curtain flow coating, gravure coating, roll coating, spin coating, blade coating, bar coating, reverse coating, die coating, spray coating, and electrostatic coating. In these cases, the near-infrared absorbing resin composition can be appropriately mixed with such an organic solvent as mentioned above and coated. The method of curing the near-infrared absorbing resin composition may be appropriately selected according to the binder resin species and other factors and there may be mentioned, for example, the method by heating, the method comprising irradiation with ultraviolet rays or electron beams.

The thickness of the above-mentioned near-infrared absorbing layer is not particularly restricted but may be appropriately selected according to the intended use. Preferably, the dry thickness is about 0.5 to 1,000 μm, more preferably 1 to 100 μm, still more preferably 1 to 50 μm, most preferably 1 to 20 μm.

In the laminate mentioned above, an ultraviolet absorbing layer is preferably disposed on the incident light side relative to the near-infrared absorbing layer. By this, it becomes possible to effectively prevent the near-infrared absorbing dye from being deteriorated by sunlight. The layer structure of such laminate is not particularly restricted but includes, for example, (1) an embodiment in which the ultraviolet absorbing layer, near-infrared absorbing layer and substrate are disposed in that order from the incident light side, and (2) an embodiment in which the ultraviolet absorbing layer, substrate and near-infrared absorbing layer are disposed in that order from the incident light side and the like. For improving the antiabration property and stain resistance, a surface protecting layer such as a silicone or organic hard coat layer or photocatalytically functioning layer may be provided on the laminate surface or, if necessary, a primer layer may be disposed between the substrate and laminate and/or between the layers of the laminate. The composition and thickness of such ultraviolet absorbing layer, surface protecting layer or primer layer are not particularly restricted.

The near-infrared absorbing coat film of the present invention is also characterized in that the deterioration in near-infrared absorbing performance is slight. A typical physical property of the coat film is that the decrease in near-infrared absorbing performance of the near-infrared absorbing dye after an accelerated weathering test is slight, namely the residual absorbing performance is high. Thus, after 48 hours of light irradiation at 63° C. in accelerated weathering test using a UV (ultraviolet) Auto Fade Meter, the residual near-infrared absorbing performance is not less than 50%. More specifically, the residual absorbing capacity which is determined by the evaluation method given below after the accelerated weathering test using a UV Auto Fade Meter on the coat film formed by using the near-infrared absorbing resin composition is not less than 50%, preferably not less than 60%, more preferably not less than 70%, still more preferably not less than 80%. The actual measurement of the residual near-infrared absorbing performance is carried out with a coat film formed by coating on a substrate showing no absorption in the near-infrared region, for example a glass sheet or a PET film.

Residual Near-infrared Absorbing Capacity Evaluation Method

A near-infrared absorbing coat film is formed on a substrate, and the light transmittance of the laminate obtained is measured at the maximum absorption wavelength in the near-infrared region using a spectrophotometer ($T_i$ initial value). The transmittance of the substrate is measured at the same wavelength ($T_0$). This laminate is subjected to accelerated weathering test by continuous irradiation at 63° C. for 48 hours using a UV Auto Fade Meter (product of Suga Test Instruments Co. model "FAL-AU-B"). After the test, the transmittance is measured at the maximum absorption wavelength in the near-infrared region (T). From these measured values, the residual absorbing capacity R (%) is calculated as follows:

$$R(\%)=(T_0-T)/(T_0-T_i)\times 100$$

The light irradiated in the accelerated weathering test preferably has the irradiance as shown in the following table.

| Ultraviolet region 300 to 400 nm | | Visible region 400 to 700 nm | | Infrared region 700 to 3000 nm | | All region 300 to 3000 nm | |
|---|---|---|---|---|---|---|---|
| Irradiance | Ratio | Irradiance | Ratio | Irradiance | Ratio | Irradiance | Ratio |
| 366 W/m² | 26.4% | 134 W/m² | 9.6% | 888 W/m² | 64.0% | 1388 W/m² | 100.0% |

Preferably, the near-infrared absorbing coat film of the invention or the laminate comprising the near-infrared absorbing coat film as a near-infrared absorbing layer has a high degree of transparency, for example a haze of not more than 3.0%, more preferably not more than 2.0%, still preferably not more than 1.0%. Such near-infrared absorbing coat films or laminates can suitably be used as windows of buildings and houses, windows of vehicles such as trains and automobiles, arcades and greenhouses and, further, for the prevention of infrared remote control devices in plasma display devices from malfunctioning, for solar cell panel protection, in sunglasses, glasses for ordinary use, protective glasses, contact lenses and so forth. Furthermore, the near-infrared absorbing resin composition can be applied to the desired parts of the above-mentioned articles or structures (e.g. window glass surfaces and so forth).

EXAMPLES

The following examples illustrate the present invention in further detail. They are, however, by no means limitative of the scope of the invention.

Synthesis Example 1

Toluene (84 g) was placed in a 500-milliliter flask equipped with a stirrer, dropping funnel, thermometer, condenser and nitrogen gas inlet and heated to 105° C. Thereto was continuously added dropwise over 3 hours, 69 g of cyclohexyl methacrylate, 16.5 g of 2-ethylhexyl acrylate, 0.5 g of methacrylic acid, 14 g of 2-hydroxyethyl methacrylate, and 2 g of 2,2'-azobis(2-methylbutyronitrile) as an initiator. The mixture was then further heated for 2 hours. Thereafter, the 18 g of toluene was added to give a 50% acrylic resin solution. The polymer constituting this acrylic resin had a number average molecular weight of 5,800. The composition of the monomer component used for the synthesis of this acrylic resin and characteristic values of the acrylic resin obtained are shown in Table 1.

Synthesis Examples 2, 4 and 5

Acrylic resins were obtained in the same manner as in Synthesis Example 1 except that the composition of the monomer mixture was varied as shown in Table 1. Characteristic values of the acrylic resins obtained are shown in Table 1.

Synthesis Example 3

Toluene (84 g) was placed in a 500-milliliter flask equipped with a stirrer, dropping funnel, thermometer, condenser and nitrogen gas inlet and heated to 115° C. Thereto was continuously added dropwise over 3 hours, 81 g of cyclohexyl methacrylate, 18.5 g of 2-ethylhexyl acrylate, 0.5 g of methacrylic acid, and 1 g of tert-butyl peroxy-2-ethylhexanoate as an initiator. The mixture was then further heated for 2 hours. Thereafter, the 18 g of toluene was added to give a 50% acrylic resin solution. The polymer constituting this acrylic resin had a number average molecular weight of 17,000. The composition of the monomer component used for the synthesis of this acrylic resin and characteristic values of the acrylic resin obtained are shown in Table 1.

Synthesis Example 6

Acrylic resin was obtained in the same manner as in Synthesis Example 3 except that the composition of the monomer component used for the synthesis of the acrylic resin was varied as shown in Table 1. Characteristic values of the acrylic resin obtained are shown in Table 1.

Synthesis Example 7

Methyl ethyl ketone (100 g), 18 g of 2-[2'-hydroxy-5'-(methacryloyloxyethyl)phenyl]-2H-benzotriazole (trademark: RUVA93, product of Otsuka Chemical Co., Ltd.), 34 g of cyclohexyl methacrylate, 3 g of styrene, 3 g of 2-ethylhexyl methacrylate, 2 g of butyl acrylate, 0.2 g of an initiator (2,2'-azobis(2-methylbutyronitrile)) were charged in a 500-milliliter flask equipped with a stirrer, dropping funnel, thermometer, condenser and nitrogen gas inlet and heated to the reflux temperature while introducing nitrogen gas and stirring. Thereto was continuously added dropwise over 2 hours a mixture of 80 g of methyl ethyl ketone, 18 g of 2-[2'-hydroxy-5'-(methacryloyloxyethyl)phenyl]-2H-benzotriazole (trademark: RUVA93, product of Otsuka Chemical Co., Ltd.), 34 g of cyclohexyl methacrylate, 3 g of styrene, 3 g of 2-ethylhexyl methacrylate, 2 g of butyl acrylate and 0.2 g of the initiator. The mixture was then further heated for 2 hours to give a 50% acrylic resin solution. The polymer constituting this acrylic resin had a number average molecular weight of 20,000.

Synthesis Example 8

Acrylic resin was obtained in the same manner as in Synthesis Example 3 except that the monomer component was varied as shown in Table 1. Characteristic values of the resin obtained are shown in Table 1.

Example 1

A near-infrared absorbing resin composition was prepared by mixing up 10 parts of the acrylic resin of Synthesis Example 1 as a binder resin, 0.23 part of a dye, 4.3 parts of toluene, and 1 part of Sumidur N 3200 (trademark, produced by Sumitomo Bayer Urethane), as a curing agent. This was applied to a substrate PET film ("Lumirror T 60" (trademark), product of Toray Industries, 50 μm), followed by drying at 80° C. to form a near-infrared absorbing layer with a film thickness of 5 μm. Further, an ultraviolet absorbing layer having a film thickness of 5 μm was formed by applying, onto the near-infrared absorbing layer, a mixture prepared from 10 parts of the acrylic resin of Synthesis Example 7, 3 parts of methyl ethyl ketone and 0.3 part of Sumidur N 3200, followed by drying at 80° C.

The sample produced in the above manner was stored at 50° C. for 7 days and then subjected to accelerated weathering test. The test sample was also measured for haze.

Examples 2 to 7 and 9

Test samples were produced in the same manner as in Example 1 following the materials constitution shown in Table 2 and subjected to accelerated weathering test. Thus, test samples were produced and subjected to accelerated weathering test in the same manner as in Example 1 except that the acrylic resin obtained in Synthesis Example 2 was used as the binder resin in Example 2, that the acrylic resin obtained in Synthesis Example 3 was used as the binder resin without Sumidur N 3200 in Example 3, that 0.16 part of dye 2 was used as the near-infrared absorbing dye in Example 4, that 0.13 part of dye 3 was used as the near-infrared absorbing dye in Example 5, and that, in Example 6, 0.5 part of trimethyl orthoformate (OFM) was added, as a dehydrating agent, to 10 parts of the acrylic resin of Synthesis Example 1 and the mixture was used after the lapse of 1 day. In Example 7, a test sample was produced and subjected to accelerated weathering test in the same manner as in Example 1 except that no ultraviolet absorbing layer was provided. In Example 9, a test sample was produced and subjected to accelerated weathering test in the same manner as in Example 1 except that the acrylic resin obtained in Synthesis Example 8 was used as the binder resin without Sumidur N 3200 and no ultraviolet absorbing layer was provided. The test samples were also measured for their haze values.

TABLE 1

| | | Synthesis Example 1 | Synthesis Example 2 | Synthesis Example 3 | Synthesis Example 4 | Synthesis Example 5 | Synthesis Example 6 | Synthesis Example 8 |
|---|---|---|---|---|---|---|---|---|
| Monomer component composition (part(s)) | 1) CHMA | 69 | 28 | 81 | — | — | — | 30 |
| | 2) 2-EHA | 16.5 | 57.5 | 18.5 | — | — | — | 9.5 |
| | 3) MMA | — | — | — | 49.5 | 15.5 | 59.5 | 60 |
| | 4) EA | — | — | — | 36 | 70 | 40 | — |
| | 5) MAA | 0.5 | 0.5 | 0.5 | 0.5 | 0.5 | 0.5 | 0.5 |
| | 6) HEMA | 14 | 14 | — | 14 | 14 | — | — |
| | 7) Initiator 1 | 2 | 2 | — | 2 | 2 | — | — |
| | 8) Initiator 2 | — | — | 1 | — | — | 1 | 1 |
| Resin Solution | Nonvolatile matter | 50 | 49.9 | 50 | 50.1 | 50.2 | 50.1 | 49.8 |
| | Number average molecular weight | 5800 | 5500 | 17000 | 5700 | 5400 | 16000 | 16000 |

Remarks are now made to Table 1.

1) CHMA stands for cyclohexyl methacrylate, 2) 2-EHA for 2-ethylhexyl acrylate, 3) MMA for methyl methacrylate, (4) EA for ethyl acrylate, 5) MAA for methacrylic acid, 6) HEMA for 2-hydroxyethyl methacrylate, 7) initiator 1 for 2,2'-azobis(2-methylbutyronitrile), and 8) initiator 2 for tert-butyl peroxy-2-ethylhexanoate.

Example 8

The near-infrared absorbing layer was formed on the PET film in the same manner as in Example 1. Further, an ultraviolet absorbing layer was formed on opposite side to the near-infrared absorbing layer relative to the PET film in the same condition as in Example 1. The sample was stored at 50° C. for 7 days and then subjected to accelerated weathering test. The test sample was also measured for haze.

Comparative Examples 1 to 3

Test samples were produced in the same manner as in Example 1 following the materials constitution shown in Table 2 and subjected to accelerated weathering test. Thus, test samples were produced and subjected to accelerated weathering test in the same manner as in Example 1 except that the binder resin of Synthesis Example 4 was used in Comparative Example 1, that the binder resin of Synthesis Example 5 was used in Comparative Example 2 and that the binder resin of Synthesis Example 6 was used without Sumidur N 3200 in Comparative Example 3.

Evaluation Methods

Coat Film Water Absorption Measurement

The near-infrared absorbing resin composition prepared in Example 1 was applied to a substrate so as to attain a dry film thickness of 1 mm, followed by 3 minutes of drying at 80° C. The film thus formed was peeled off from the substrate to give a near-infrared absorbing film, 3 cm×3 cm in size. This was stored at 50° C. for 7 days, then dried by heating at 80° C. under reduced pressure conditions (about 20 mPa) for 12 hours and, thereafter, weighed ($W_0$). This film was immersed in water, stored in that state at room temperature for 20 days, then taken out of the water, and weighed ($W_1$). From these values, the water absorption was calculated as follows:

Coat film water absorption (% by mass)=$\{(W_1-W_0)/W_0\} \times 100$

In Examples 2 to 8 and Comparative Examples 1 to 3 as well, sample films were produced and tested in the same manner. The results are shown in Table 2. In Examples 3 and 9 and Comparative Example 3, the curing agent (Sumidur N 3200) was not used.

Dye Weathering Resistance

The test samples produced in Examples 1 to 9 and Comparative Examples 1 to 3 were each subjected to light transmission measurement at the maximum absorption wavelength using a spectrophotometer ($T_i$ initial value). The substrate film was also measured for light transmission at that wavelength ($T_0$). These test samples were each subjected to an accelerated weathering test; namely they were subjected to 48 hours of continuous irradiation at 63° C. in a UV Auto Fade Meter (product of Suga Test Instruments, trademark "FAL-AU-B"). After the test, each sample was measured for light transmission (T) at the maximum absorption wavelength. In the irradiation test, all the samples except for the sample of Example 7 were irradiated with light (ultraviolet light) from the ultraviolet absorbing layer side. In Example 7, the sample was irradiated from the near-infrared absorbing layer side. From these values, the residual near-infrared absorbing capacity R (%) values were calculated using the formula shown below. The results are shown in Table 2.

$$R(\%)=(T_0-T)/(T_0-T_i) \times 100$$

TABLE 2

|  |  |  | Example | | | | | | | | | Comparative Example | | |
|---|---|---|---|---|---|---|---|---|---|---|---|---|---|---|
|  |  |  | 1 | 2 | 3 | 4 | 5 | 6 | 7 | 8 | 9 | 1 | 2 | 3 |
| Resin composition for near-infrared absorbing layer formation (parts(s)) | Binder resin | Synthesis Example 1 | 10 | — | — | 10 | 10 | 10 | 10 | 10 | — | — | — | — |
|  |  | Synthesis Example 2 | — | 10 | — | — | — | — | — | — | — | — | — | — |
|  |  | Synthesis Example 3 | — | — | 10 | — | — | — | — | — | — | — | — | — |
|  |  | Synthesis Example 4 | — | — | — | — | — | — | — | — | — | 10 | — | — |
|  |  | Synthesis Example 5 | — | — | — | — | — | — | — | — | — | — | 10 | — |
|  |  | Synthesis Example 6 | — | — | — | — | — | — | — | — | — | — | — | 10 |
|  |  | Synthesis Example 8 | — | — | — | — | — | — | — | — | 10 | — | — | — |
|  | Dye | Dye 1 | 0.23 | 0.23 | 0.23 | — | — | 0.23 | 0.23 | 0.23 | 0.23 | 0.23 | 0.23 | 0.23 |
|  |  | Dye 2 | — | — | — | 0.16 | — | — | — | — | — | — | — | — |
|  |  | Dye 3 | — | — | — | — | 0.13 | — | — | — | — | — | — | — |
|  | Dehydrating agent | OFM | — | — | — | — | — | 0.5 | — | — | — | — | — | — |
| Near-infrared absorbing layer curing agent Sumidur N 3200 | | | 1 | 1 | — | 1 | 1 | 1 | 1 | 1 | — | 1 | 1 | — |
| Resin composition for ultraviolet absorbing layer formation (part(s)) | Binder resin | Synthesis Example 7 | 10 | 10 | 10 | 10 | 10 | 10 | — | 10 | — | 10 | 10 | 10 |
|  | Sumidur N3200 | | 0.3 | 0.3 | 0.3 | 0.3 | 0.3 | 0.3 | — | 0.3 | — | 0.3 | 0.3 | 0.3 |
| Evaluation results | Water absorption (%) | | 0.7 | 1.2 | 1.1 | 0.7 | 0.6 | 0.7 | 0.7 | 0.7 | 1.8 | 2.5 | 3.0 | 2.8 |
|  | Residual near-infrared absorbing capacity (%) | | 90 | 78 | 80 | 94 | 98 | 95 | 84 | 87 | 57 | 48 | 39 | 41 |

Remarks are made to Table 2 as follows.

Dye 1 stands for $VOPc(2,5-Cl_2PhO)_8\{2,6-(CH_3)_2PhO\}_4\{Ph(CH_3)CHNH\}_3F$, dye 2 for $VOPc(2,5-Cl_2PhO)_8\{2,6-(CH_3)_2PhO\}_4(PhCH_2NH)_4$, dye 3 for $CuPc(2,5-Cl_2Pho)_8\{2,6-(CH_3)_2PhO\}_4(PhCH_2NH)_4$, and the dehydrating agent OFM for trimethyl orthoformate.

Haze Measurement

The test samples produced in Examples 1 to 9 were subjected to haze measurement according to JIS K 7105 using a haze meter (product of Nippon Denshoku). The results are shown in Table 3.

TABLE 3

| | Example | | | | | | | | |
|---|---|---|---|---|---|---|---|---|---|
| | 1 | 2 | 3 | 4 | 5 | 6 | 7 | 8 | 9 |
| Haze (%) | 0.8 | 0.8 | 0.8 | 0.8 | 0.8 | 0.8 | 0.8 | 0.8 | 0.8 |

The present application claims priority under 35 U.S.C. § 119 to Japanese Patent Application No.2001-051078, filed Feb. 26, 2001, entitled "NEAR-INFRARED ABSORBING COAT FILM AND NEAR-INFRARED ABSORBING RESIN COMPOSITION". The content of this application is incorporated herein by reference in its entirety.

The invention claimed is:

1. A near-infrared absorbing coat film comprising a near-infrared absorbing dye having a maximum absorption wavelength of 780 nm to 1200 nm, which has a residual near-infrared absorbing capacity of not less than 50% after 48 hours of light irradiation in en accelerated weathering test using a UV Auto Fade Meter, wherein said near-infrared absorbing coat film is formed out of a near-infrared absorbing resin composition comprising a polymer resulting from polymerization of a monomer component containing not less than 30% by mass of a monomer represented by the following general formula (1):

$$CH_2=C(R^4)-CO-OZ \qquad (1)$$

in the formula, $R^4$ represents a hydrogen atom or a methyl group and Z represents a hydrocarbon group containing 4 to 25 carbon atoms, and the polymer has a number average molecular weight 1,000 to 100,000.

2. The near-infrared absorbing coat film according to claim 1, wherein the near-infrared absorbing dye is a compound represented by the following general formula (2):

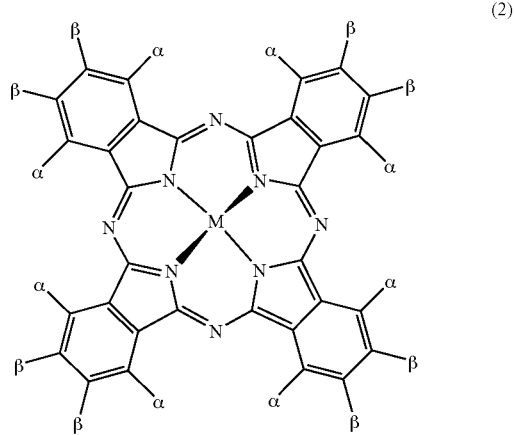

in the formula, plurality of α are the same or different and each represents $SR^1$, $OR^2$, $NHR^2$ or a halogen atom and at least one of them is $NHR^3$; $R^1$, $R^2$ and $R^3$ are the same or different and each represents a phenyl group, an alkyl group having 1 to 20 carbon atoms or an aralkyl group having 7 to 20 carbon atoms, and each of said groups may have a substituent; plurality of β are the same or different and each represents $SR^1$, $OR^2$ or a halogen atom and at least one of them is $SR^1$ or $OR^2$; at least one of the pluralities of α and β is a halogen atom or $OR^2$; and M represents a non-metal, a metal, a metal oxide or a metal halide.

3. A near-infrared absorbing resin composition which comprises a near-infrared absorbing dye having a maximum absorption wavelength of 780 nm to 1200 nm and a polymer resulting from polymerization of a monomer component comprising not less than 30% by mass of a monomer represented by the following general formula (1):

$$CH_2=C(R^4)-CO-OZ \qquad (1)$$

in the formula, $R^4$ represents a hydrogen atom or a methyl group and Z represents a hydrocarbon group containing 4 to 25 carbon atoms.

* * * * *